| (12) | United States Patent | (10) Patent No.: | US 9,890,329 B2 |
|---|---|---|---|
| | Chen et al. | (45) Date of Patent: | Feb. 13, 2018 |

(54) QUANTUM DOT NANOCRYSTAL STRUCTURE

(71) Applicant: NATIONAL TSING HUA UNIVERSITY, Hsinchu (TW)

(72) Inventors: Hsueh-Shih Chen, Hsinchu (TW); Guan-Hong Chen, Kaohsiung (TW); Kai-Cheng Wang, Taipei (TW); Chang-Wei Yeh, Taoyuan (TW); Cheng-Wei Chang, Hsinchu (TW); Ching-Che Hung, New Tsipei (TW)

(73) Assignee: NATIONAL TSING HUA UNIVERSITY, Hsinchu (TW)

( * ) Notice: Subject to any disclaimer, the term of this patent is extended or adjusted under 35 U.S.C. 154(b) by 145 days.

(21) Appl. No.: 14/712,398

(22) Filed: May 14, 2015

(65) Prior Publication Data

US 2016/0333267 A1   Nov. 17, 2016

(51) Int. Cl.
*B32B 5/14* (2006.01)
*B32B 5/16* (2006.01)
(Continued)

(52) U.S. Cl.
CPC .............. *C09K 11/883* (2013.01); *B82Y 30/00* (2013.01); *B82Y 40/00* (2013.01); *Y10S 977/774* (2013.01)

(58) Field of Classification Search
CPC ......... B82Y 10/00; B82Y 30/00; B82Y 40/00; B32B 5/14; B32B 5/16; B32B 5/22; B32B 7/00
See application file for complete search history.

(56) References Cited

U.S. PATENT DOCUMENTS 5,299,217 A * 3/1994 Migita ................... B82Y 20/00
                                                                    257/103
8,313,714 B2   11/2012 Asokan et al.
(Continued)

FOREIGN PATENT DOCUMENTS

TW         I462879 B       12/2014
TW       201500289 A        1/2015

OTHER PUBLICATIONS

Synthesis and Structural, Optical, and Dynamic Properties of Core/Shell/Shell CdSe/ZnSe/ZnS Quantum Dots, Fitzmorris et al., J. Phys. Chem. C 2012, 116, 25065-25073.*
(Continued)

*Primary Examiner* — Khanh Tuan Nguyen
*Assistant Examiner* — Haidung Nguyen
(74) *Attorney, Agent, or Firm* — Birch, Stewart, Kolasch & Birch, LLP

(57) ABSTRACT

A quantum dot nanocrystal structure includes: a core of a compound M1A1, wherein M1 is a metal selected from Zn, Sn, Pb, Cd, In, Ga, Ge, Mn, Co, Fe, Al, Mg, Ca, Sr, Ba, Ni, Ag, Ti and Cu, and A1 is an element selected from Se, S, Te, P, As, N, I, and O; an inner shell having a composition containing a compound $M1_xM2_{1-x}A1_yA2_{1-y}$, wherein M2 is a metal selected from Zn, Sn, Pb, Cd, In, Ga, Ge, Mn, Co, Fe, Al, Mg, Ca, Sr, Ba, Ni, Ag, Ti and Cu, A2 is an element selected from Se, S, Te, P, As, N, I and O; and a multi-pod-structured outer shell of a compound M1A2 or M2A2 enclosing the inner shell and having a base portion and protrusion portions extending from the base portion.

12 Claims, 10 Drawing Sheets

(51) Int. Cl.
*B32B 5/22* (2006.01)
*B32B 7/00* (2006.01)
*C09K 11/88* (2006.01)
*B82Y 30/00* (2011.01)
*B82Y 40/00* (2011.01)

(56) References Cited

U.S. PATENT DOCUMENTS

| | | | |
|---|---|---|---|
| 2007/0001581 A1* | 1/2007 | Stasiak | B82Y 20/00 |
| | | | 313/498 |
| 2007/0186846 A1 | 8/2007 | Yong et al. | |
| 2011/0089375 A1 | 4/2011 | Chan et al. | |
| 2012/0113672 A1* | 5/2012 | Dubrow | B82Y 20/00 |
| | | | 362/602 |
| 2012/0315391 A1* | 12/2012 | Char | B82Y 10/00 |
| | | | 427/216 |
| 2013/0032767 A1 | 2/2013 | Manna et al. | |

OTHER PUBLICATIONS

Seeded Growth of Highly LuminescentCdSe/CdS Nanoheterostructures with Rod and Tetrapod Morphologies, Talapin et al., Nano Lett., vol. 7, No. 10, 2007.*
Strain effects on optical properties of tetrapod-shaped CdTe/CdS core-shell nanocrystals, Yao et al., Superlattices and Microstructures 76 (2014) 244-252.*
Single-Step Synthesis of Quantum Dots with Chemical Composition Gradients, Bae et al., Chem. Mater. 2008, 20, 531-539.*

* cited by examiner

QUANTUM DOT NANOCRYSTAL STRUCTURE

FIELD

The disclosure relates to a quantum dot nanocrystal structure, more particularly to a quantum dot nanocrystal structure including a core, an inner shell and a multi-pod-structured outer shell.

BACKGROUND

U.S. Patent Application Publication No. 2011/0006285 discloses a core-alloyed shell semiconductor nanocrystal that includes a core of a semiconductor material, a core-overcoating shell enclosing the core, and an outer organic ligand layer. The semiconductor material may be selected from PbS, PbSe, PbTe, CdTe, InN, InP, InAs, InSb, HgS, HgSe, and GaSb when the band gap energy of the semiconductor material is in the infrared energy range, and may be selected from CdSe, CdTe, ZnSe, ZnTe, AlAs, AlP, AlSb, AlN, GaP and GaAs when the band gap energy of the semiconductor material is in the visible energy range.

U.S. Patent Application Publication No. 2013/0032767 discloses an octapod shaped nanocrystal that includes a core and eight pods. The core includes a material crystallized in a cubic phase and having eight developed {111} facets. The pods are crystallized in a hexagonal phase on the eight {111} facets, and have a length greater than 5 nm.

The inclusion of the pods in the nanocrystal may enhance the stability and quantum efficiency of the nanocrystal. However, the pods of the conventional nanocrystal may tend to break, which results in a decrease in the stability and quantum efficiency of the nanocrystal.

SUMMARY

An object of the disclosure is to provide a quantum dot nanocrystal structure that may overcome at least one of the aforesaid drawbacks associated with the prior art.

According to the disclosure, there is provided a quantum dot nanocrystal structure that includes: a core of a compound M1A1, wherein M1 is a metal selected from the group consisting of Zn, Sn, Pb, Cd, In, Ga, Ge, Mn, Co, Fe, Al, Mg, Ca, Sr, Ba, Ni, Ag, Ti and Cu, and A1 is an element selected from the group consisting of Se, S, Te, P, As, N, I, and O; an inner shell enclosing the core and having a composition containing a compound $M1_xM2_{1-x}A1_yA2_{1-y}$, wherein M2 is different from M1 and is a metal selected from the group consisting of Zn, Sn, Pb, Cd, In, Ga, Ge, Mn, Co, Fe, Al, Mg, Ca, Sr, Ba, Ni, Ag, Ti and Cu, A2 is different from A1 and is an element selected from the group consisting of Se, S, Te, P, As, N, I and O, $0<x\leq 1$, $0<y<1$, and y decreases over a layer thickness of the inner shell in a direction from the core toward the inner shell; and a multi-pod-structured outer shell of a compound M1A2 or M2A2. The multi-pod-structured outer shell encloses the inner shell, and has a base portion and a plurality of protrusion portions that are spaced apart from one another and that extend from the base portion in a direction away from the inner shell.

BRIEF DESCRIPTION OF THE DRAWINGS

In drawings which illustrate an embodiment of the disclosure.

DETAILED DESCRIPTION

Figure 1:
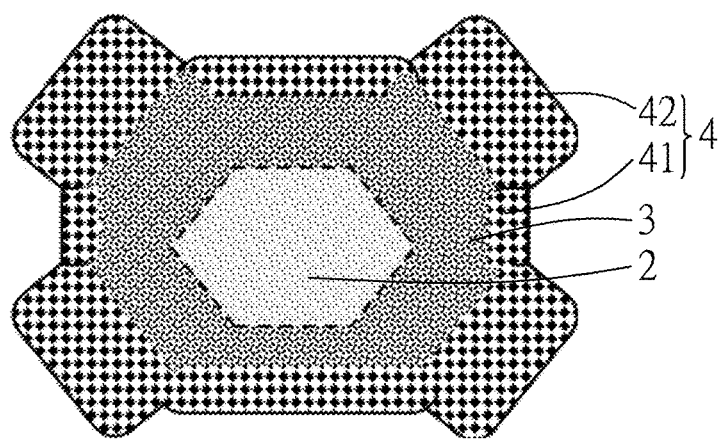
FIG. 1 is a schematic view of the first embodiment of a quantum dot nanocrystal structure according to the disclosure.

FIG. 1 illustrates the first embodiment of a quantum dot nanocrystal structure according to the disclosure. The quantum dot nanocrystal structure includes a core 2 of a compound M1A1, an inner shell 3, and a multi-pod-structured outer shell 4 of a compound M1A2 or M2A2.

M1 of the compound M1A1 is a metal selected from the group consisting of Zn, Sn, Pb, Cd, In, Ga, Ge, Mn, Co, Fe, Al, Mg, Ca, Sr, Ba, Ni, Ag, Ti and Cu. A1 of the compound M1A1 is an element selected from the group consisting of Se, S, Te, P, As, N, I, and O.

The inner shell 3 encloses the core 2, and has a composition containing a compound $M1_xM2_{1-x}A1_yA2_{1-y}$, wherein M2 is different from M1 and is a metal selected from the group consisting of Zn, Sn, Pb, Cd, In, Ga, Ge, Mn, Co, Fe, Al, Mg, Ca, Sr, Ba, Ni, Ag, Ti and Cu, A2 is different from A1 and is an element selected from the group consisting of Se, S, Te, P, As, N, I and O, $0<x\leq 1$, $0<y<1$, and y decreases over a layer thickness of the inner shell 3 in a direction from the core 2 toward the inner shell 3.

The multi-pod-structured outer shell 4 encloses the inner shell 3, and has a base portion 41 and a plurality of pod-like protrusion portions 42 that are spaced apart from one another and that extend from the base portion 41 in a direction away from the inner shell 3. The base portion 41 cooperates with the pod-like protrusion portions 42 to enclose entirely the inner shell 3.

In certain embodiments, the number of the pod-like protrusion portions 42 may be greater than 2 and less than 10. In certain embodiments, the number of the pod-like protrusion portions 42 may range from 3 to 5.

In certain embodiments, the pod-like protrusion portions 42 and the base portion 41 may concurrently formed and shaped on the inner shell 3 through a thermally equilibrium process during crystal growth of the multi-pod-structured outer shell 4, which is different from conventional processes of growing on facets of crystal seeds of a core along specific directions. In certain embodiments, the multi-pod-structured outer shell 4 has a thermally equilibrium shape.

In certain embodiments, the multi-pod-structured outer shell 4 and the inner shell 3 may be concurrently formed through the thermally equilibrium process during crystal growth of the quantum dot nanocrystal structure.

Since the shape or structure of the multi-pod-structured outer shell 4 is formed through the thermally equilibrium process and since the pod-like protrusion portions 42 are interconnected through and are integrally formed with the base portion 41, the pod-like protrusion portions 42 may exhibit a relatively high mechanical strength on the inner shell 3, which may enhance the stability and quantum efficiency of the quantum dot nanocrystal structure.

In certain embodiments, x of the compound $M1_xM2_{1-x}A1_yA2_{1-y}$ may vary over the layer thickness of the inner shell 3 when x is less than 1, M1 of the compound $M1_xM2_{1-x}A1_yA2_{1-y}$ may be Zn, M2 of the compound $M1_xM2_{1-x}A1_yA2_{1-y}$ may be Cd, A1 of the compound $M1_xM2_{1-x}A1_yA2_{1-y}$ may be Se, and A2 of the compound $M1_xM2_{1-x}A1_yA2_{1-y}$ may be S.

In certain embodiments, M1 of the compound $M1_xM2_{1-x}A1_yA2_{1-y}$ may be Cd, M2 of the compound $M1_xM2_{1-x}A1_yA2_{1-y}$ may be Zn, A1 of the compound $M1_xM2_{1-x}A1_yA2_{1-y}$ may be Se, and A2 of the compound $M1_xM2_{1-x}A1_yA2_{1-y}$ may be S.

In certain embodiments, x of the compound $M1_xM2_{1-x}A1_yA2_{1-y}$ is equal to 1, M1 of the compound $M1_xM2_{1-x}A1_yA2_{1-y}$ is Zn, A1 of the compound $M1_xM2_{1-x}A1_yA2_{1-y}$ may be Se, and A2 of the compound $M1_xM2_{1-x}A1_yA2_{1-y}$ may be S.

In certain embodiments, the compound $M1_xM2_{1-x}A1_yA2_{1-y}$ is doped with an element A3 that is different from A1 and A2 and that is selected from the group consisting of Se, S, Te, P, As, N, I and O. In certain embodiments, A3 may be I.

Particles of the quantum dot nanocrystal structure may be used in a light emitting device, such that in certain embodiments, the inclusion of M2 in the inner shell 3 may control the light emission wavelength (the peak wavelength) of the light emitting device. In certain embodiments, the peak wavelength of the quantum dot nanocrystal structure may vary from about 550 nm to about 650 nm in accordance with the concentration of M2, such as Cd, in the inner shell 3.

In certain embodiments, the core 2 has a diameter ranging from 1 nm to 8 nm, the layer thickness of the inner shell 3 ranges from 0.5 nm to 5 nm, the base portion 41 of the multi-pod-structured outer shell 4 has a layer thickness ranging from 0.5 nm to 5 nm, and the pod-like protrusion portions 42 have a length ranging from 1 nm to 10 nm.

Figure 2:
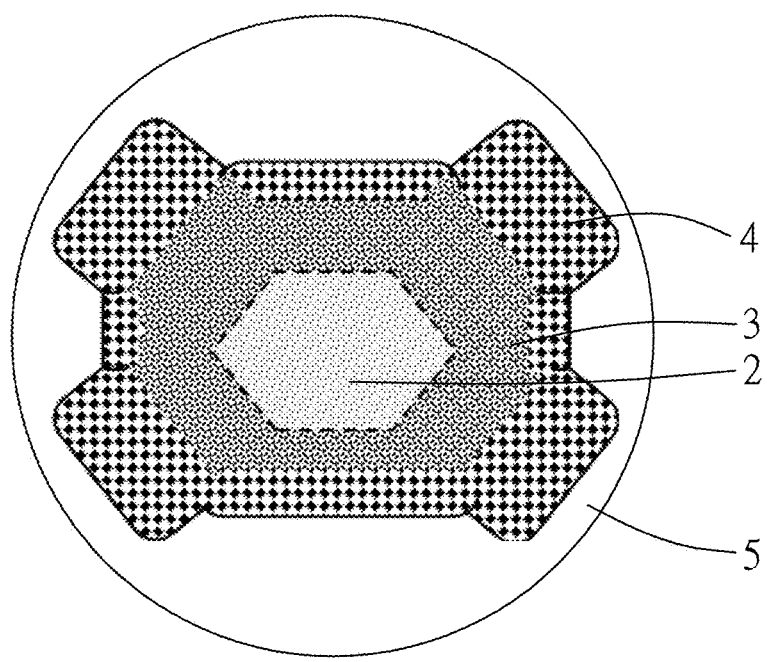
FIG. 2 is a schematic view of the second embodiment of a quantum dot nanocrystal structure according to the disclosure.

FIG. 2 illustrates the second embodiment of the quantum dot nanocrystal structure according to the disclosure.

The second embodiment differs from the previous embodiment in that the second embodiment further includes a cover layer 5 of an organic-inorganic oxide hybrid polymer that covers the multi-pod-structured outer shell 4. In certain embodiments, the organic-inorganic oxide hybrid polymer has a formula of $Si_uTi_vO_{4-z}$-OG (STO-OG), wherein $0.2 \le u \le 0.4$, $0.6 \le v \le 0.8$, $0.01 < z < 3.99$, STO represents $Si_uTi_vO_{4-z}$, and OG represents organic molecules. In certain embodiments, z=2.26, and OG is 2,4-pentanedione. The organic-inorganic oxide hybrid polymer (STO-OG polymer) has a structure that includes a STO porous matrix and the organic molecules filling in pores in the STO porous matrix.

The following Examples and Comparative Example are provided to illustrate the embodiments of the disclosure, and should not be construed as limiting the scope of the disclosure.

Example 1

Preparation of Zn and Cd Precursors 0.27 g CdO and 7.39 g zinc acetate anhydrous were added into a three neck round-bottom flask. The mixture was degassed under 100 mTorr for 120 minutes. 10 g trioctylphosphine (TOP), 24.68 g oleic acid and 116.7 g 1-octadecene (ODE) were added into the three neck round-bottom flask to form a Zn—Cd-containing precursor, followed by purging the three neck round-bottom flask with a nitrogen gas.

Preparation of a Mixture of Se and S Precursors 20 ml ODE and 0.74 g sulfur powder were mixed under room temperature to form a sulfur precursor (ODES). 20 ml TOP and 0.79 g selenium powder were mixed under room temperature to form a selenium precursor (TOPSe). The sulfur precursor and the selenium precursor were mixed in a flask to form a Se—S-containing precursor. The flask was purged with a nitrogen gas.

Preparation of $ZnSe/Zn_xCd_{1-x}Se_yS_{1-y}$/ZnS Quantum Dot

The Zn—Cd-containing precursor in the three neck round-bottom flask was heated to 260° C., followed by injecting the Se—S-containing precursor into the three neck round-bottom flask to allow a first stage reaction between the Zn—Cd-containing precursor and the Se—S-containing precursor to occur for one minute and then heating the mixture to 320° C. to allow a second stage reaction to occur for three minutes. After the reaction, the mixture was cooled to 160° C., and was remained at this temperature for one hour. The mixture was then further cooled, and was repeatedly washed with a mixture of 50 ml toluene and 50 ml ethanol so as to obtain a powder of the quantum dot of Example 1 (the powder may be stored in a toluene solution).

Figure 3:
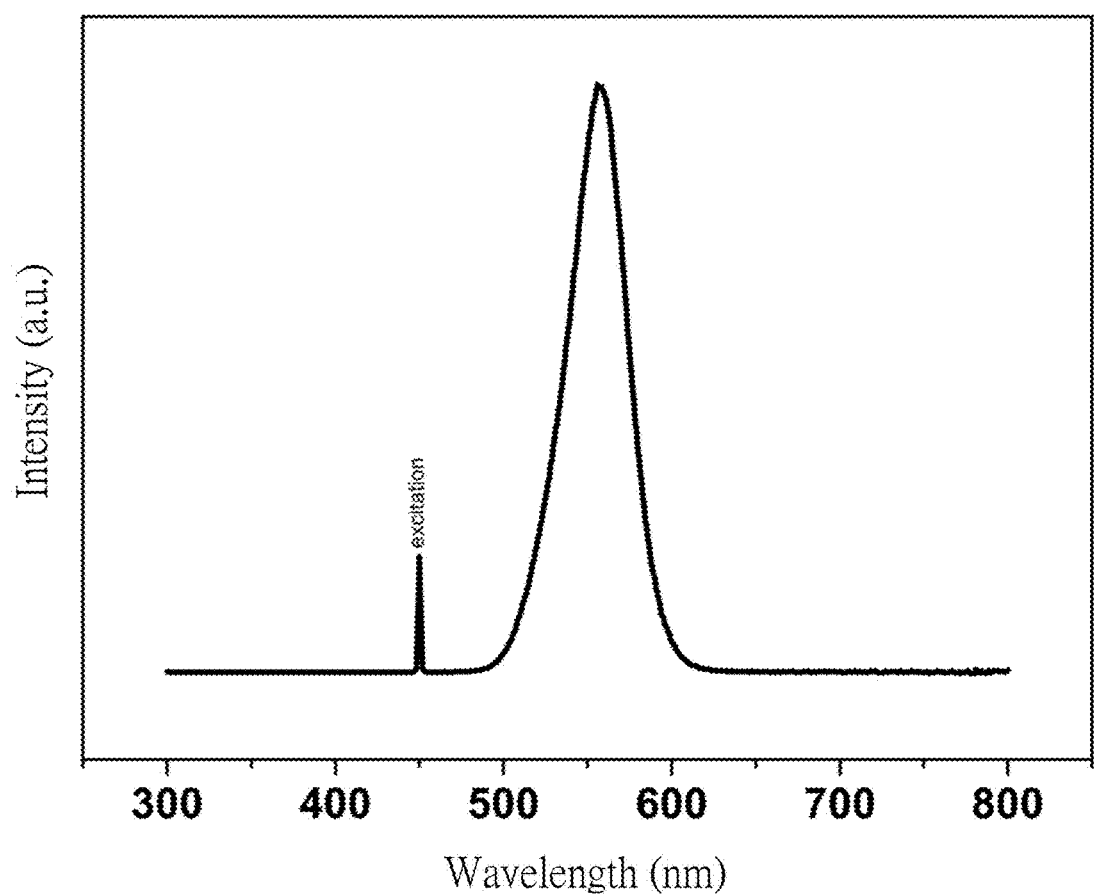
FIG. 3 is a plot of luminous intensity vs wavelength illustrating the results of a light emission wavelength of quantum dots of Example 1.

The quantum dot of Example 1 exhibited a peak wavelength of about 555 nm when subjected to a light emission test (see FIG. 3). In the light emission test, the quantum dots of Example 1 were dispersed in a silicone matrix layer to form a light conversion film, followed by passing a light source (having a wavelength of about 450 nm) emitted from a GaN LED chip through the light conversion film for converting the light source.

Figure 4:
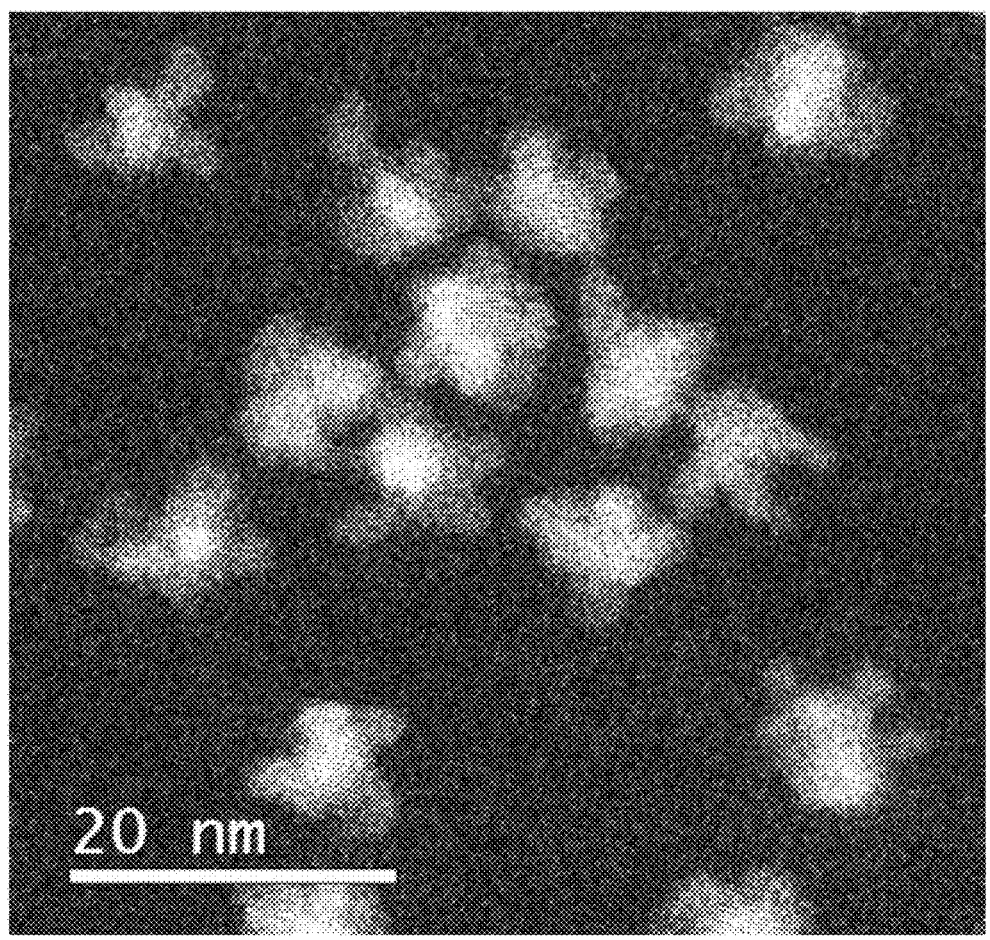
FIGS. 4 and 5 are TEM images showing the shape and structure of the quantum dots of Example 1.
Figure 5:
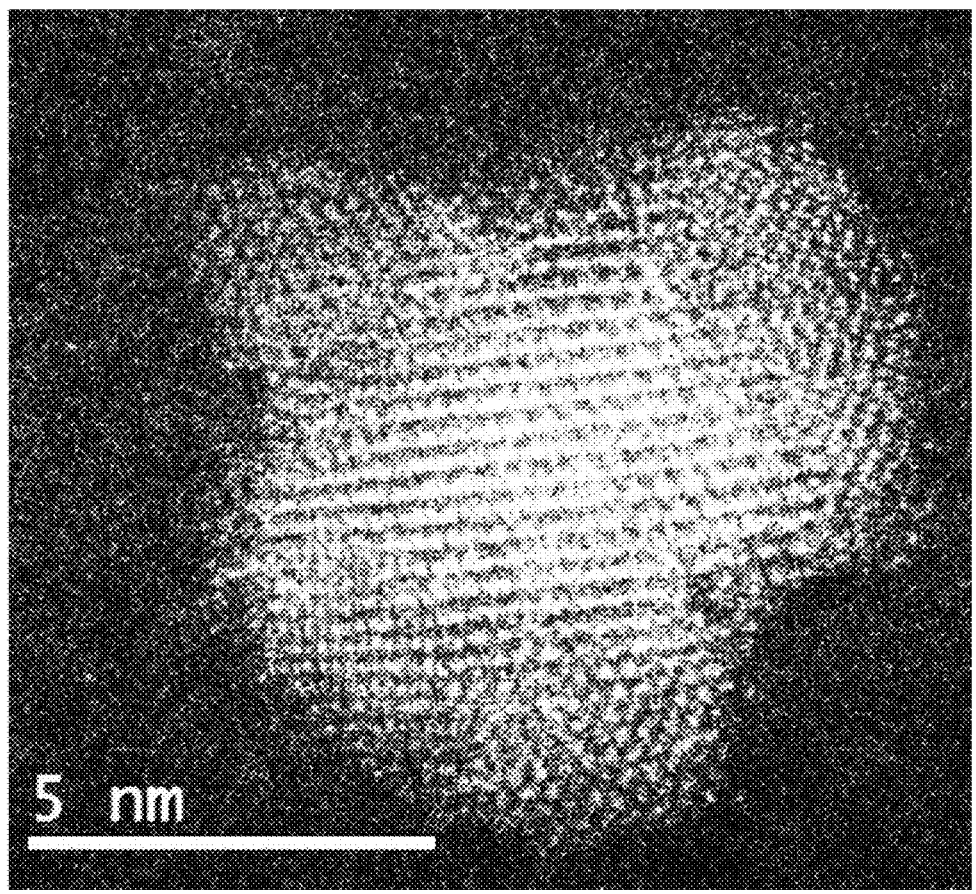
Figure 6:
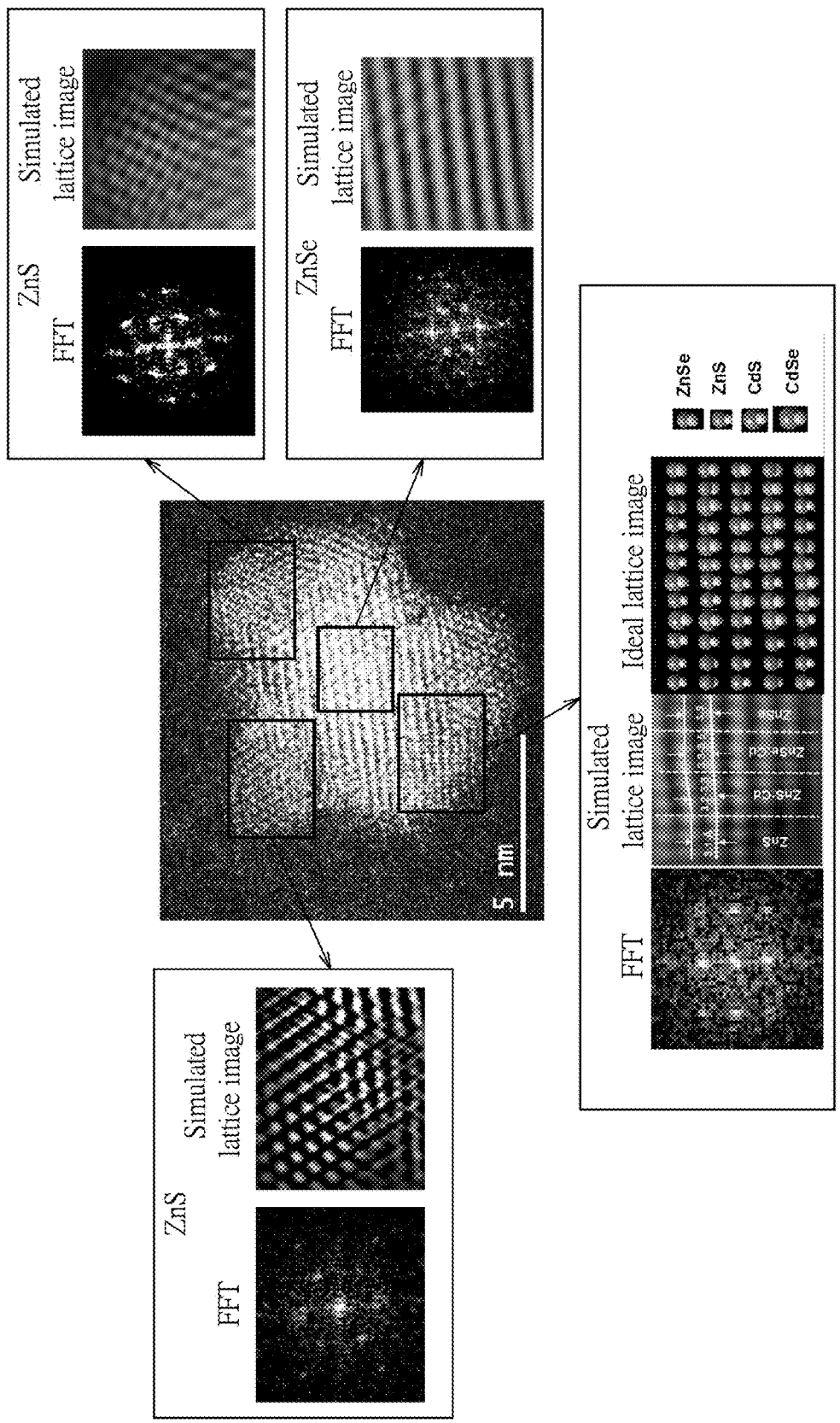
FIG. 6 is a TEM image of the quantum dot of Example 1 accompanied with inserted FFT (Fourier Transform) images and simulated lattice images that illustrate the structures of different zones of the quantum dot of Example 1, respectively.

FIGS. 4 and 5 are TEM images showing the shape and structure of the quantum dots of Example 1. FIG. 6 is a TEM image of the quantum dot of Example 1 accompanied with inserted FFT (Fourier Transform) images and simulated lattice images that illustrate the structures of different zones of the quantum dot of Example 1, respectively.

Example 2

The procedures and the operating conditions of Example 2 were similar to those of Example 1, except that the amount of CdO employed in Example 2 was 0.2 g and that the first and second stage reactions lasted for 30 seconds and one minute, respectively.

Figure 7:
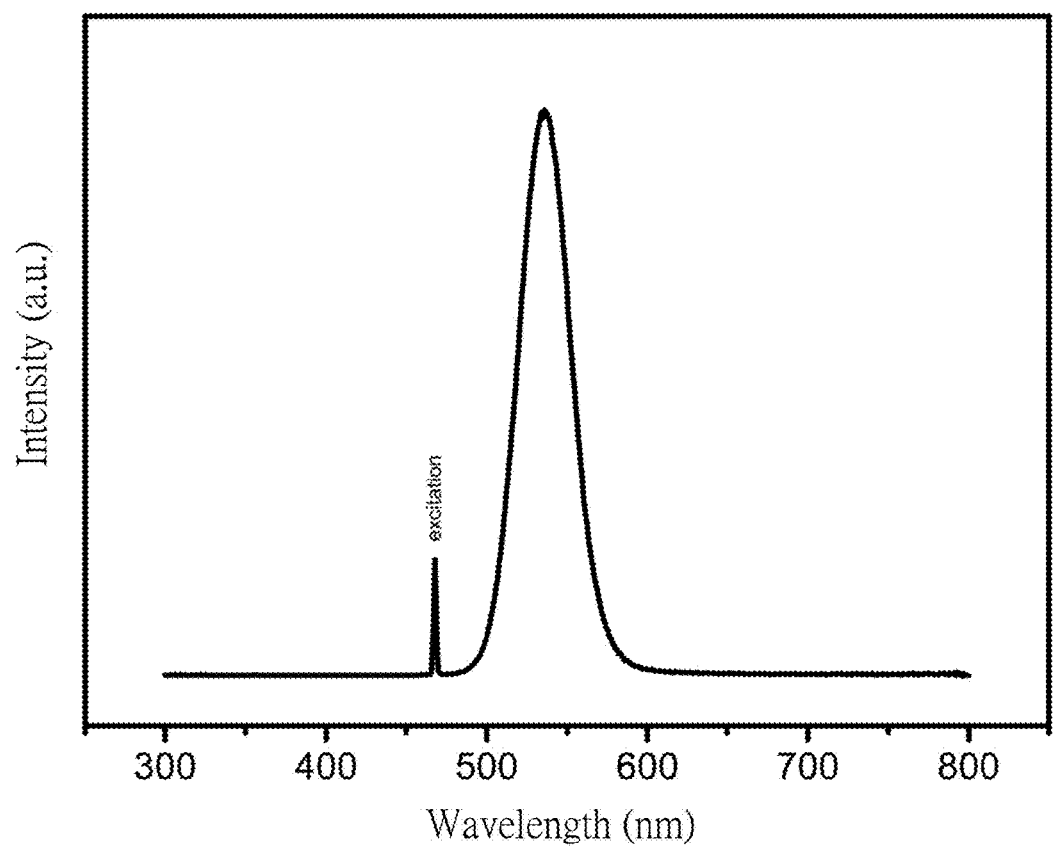
FIG. 7 is a plot of luminous intensity vs wavelength illustrating the results of a light emission wavelength of the quantum dots of Example 2.

The quantum dot of Example 2 exhibited a peak wavelength of 536 nm (see FIG. 7) when subjected to the light emission wavelength test using a light source having a wavelength of about 470 nm.

Example 3

The procedures and the operating conditions of Example 3 were similar to those of Example 1, except that the amount of CdO employed in Example 3 was 0.3 g and that the second stage reaction lasted for five minutes.

The quantum dot of Example 3 exhibited a peak wavelength of 575 nm when subjected to the light emission wavelength test using a light source having a wavelength of about 450 nm.

Example 4

The procedures and the operating conditions of Example 4 were similar to those of Example 1, except that the amount of CdO employed in Example 4 was 0.5 g and that the second stage reaction lasted for five minutes.

The quantum dot of Example 4 exhibited a peak wavelength of 590 nm when subjected to the light emission wavelength test using a light source having a wavelength of about 450 nm.

Example 5

The procedures and the operating conditions of Example 5 were similar to those of Example 1, except that the amount of CdO employed in Example 5 was 1 g and that the first and second stage reactions lasted for 3 minutes and fifteen minutes, respectively.

The quantum dot of Example 5 exhibited a peak wavelength of 650 nm when subjected to the light emission wavelength test using a light source having a wavelength of about 450 nm.

Example 6

Preparation of Zn Precursors 5 mmol of zinc oxide were added into a three neck round-bottom flask. The mixture was degassed under 100 mTorr for 120 minutes. 5 g lauric acid and 1.93 g hexadecylamine were added into the three neck round-bottom flask to form a Zn-containing precursor, followed by purging the three neck round-bottom flask with a nitrogen gas.

Preparation of a Mixture of Se and S Precursors 5 ml TOP and 0.35 g sulfur powder were mixed under room temperature to forma sulfur precursor (TOPS). 2.5 ml TOP and 0.7 g selenium powder were mixed under room temperature to forma selenium precursor (TOPSe). The sulfur precursor and the selenium precursor were mixed in a flask to form a Se—S-containing precursor. The flask was purged with a nitrogen gas.

Preparation of $ZnSe/ZnSe_yS_{1-y}/ZnS$ Quantum Dot

The Zn-containing precursor in the three neck round-bottom flask was heated to 300° C., followed by injecting the Se—S-containing precursor into the three neck round-bottom flask to allow a first stage reaction between the Zn-containing precursor and the Se—S-containing precursor to occur for one minute and then heating the mixture to 280° C. to allow a second stage reaction to occur for three minutes. After the reaction, the mixture was cooled to 160° C., and was remained at this temperature for one hour. The mixture was then further cooled, and was repeatedly washed with a mixture of 50 ml toluene and 50 ml ethanol so as to obtain a powder of the quantum dot of Example 6.

Figure 8:
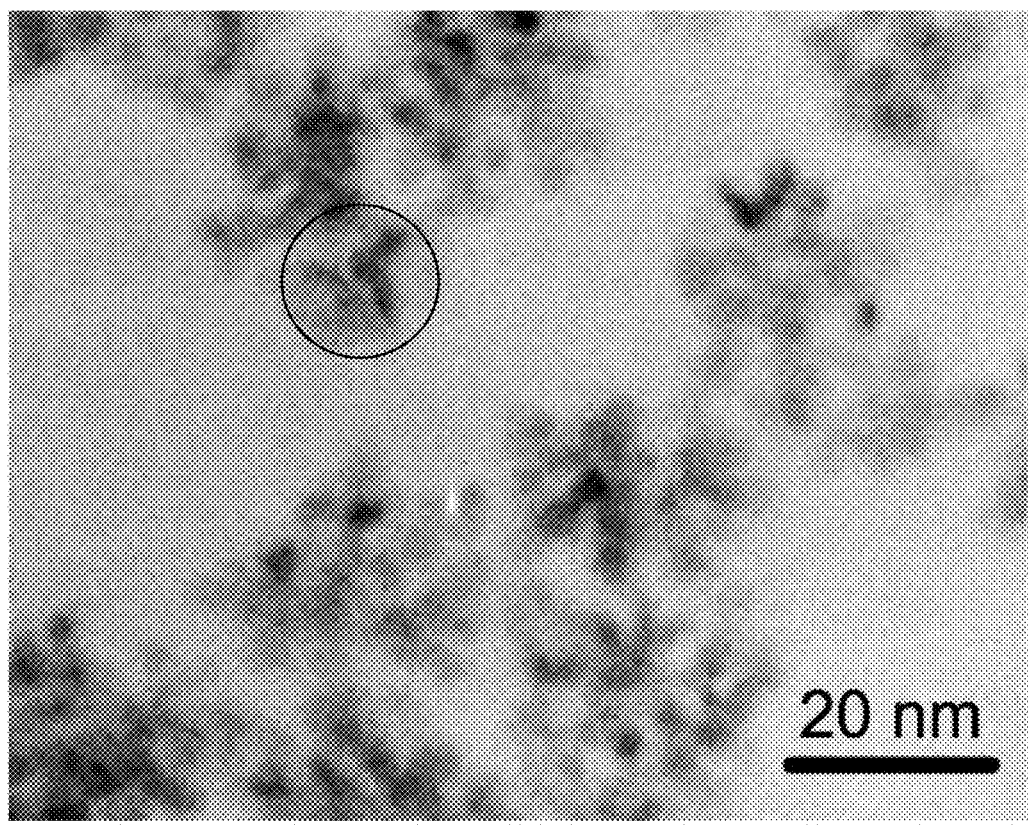
FIG. 8 is a TEM image showing the shape and structure of the quantum dots of Example 6.

FIG. 8 is a TEM image showing the shape and structure of the quantum dots of Example 6.

Example 7

Preparation of Zn Precursors 0.41 g zinc oxide anhydrous were added into a three neck round-bottom flask. The mixture was degassed under 100 mTorr for 120 minutes. 1.6 g lauric acid and 1.93 g hexadecylamine, were added into the three neck round-bottom flask to form a Zn-containing precursor, followed by purging the three neck round-bottom flask with a nitrogen gas.

Preparation of a Mixture of Se, S and I Precursors 2 ml TOP and 0.12 g sulfur powder were mixed under room temperature to form a sulfur precursor (TOPS). 1 ml TOP and 0.12 g selenium powder were mixed under room temperature to forma selenium precursor (TOPSe). 1 ml TOP, 0.012 g iodine and 0.12 g Se powder were mixed to form an iodine-containing precursor. The sulfur precursor, the iodine-containing precursor and the selenium precursor were mixed in a flask to form a Se—S—I-containing precursor. The flask was purged with a nitrogen gas.

Preparation of $ZnSe/ZnSe_yS_{1-y}:I/ZnS$ Quantum Dot

The Zn-containing precursor in the three neck round-bottom flask was heated to 280° C., followed by injecting the Se—S—I-containing precursor into the three neck round-bottom flask to allow a first stage reaction between the Zn-containing precursor and the Se—S—I-containing precursor to occur for one minute and then heating the mixture to 260° C. to allow a second stage reaction to occur for three minutes. After the reaction, the mixture was cooled to 150° C., and was remained at this temperature for one hour. The mixture was then further cooled, and was repeatedly washed with a mixture of 50 ml toluene and 50 ml ethanol so as to obtain a powder of the quantum dot of Example 7.

Figure 9:
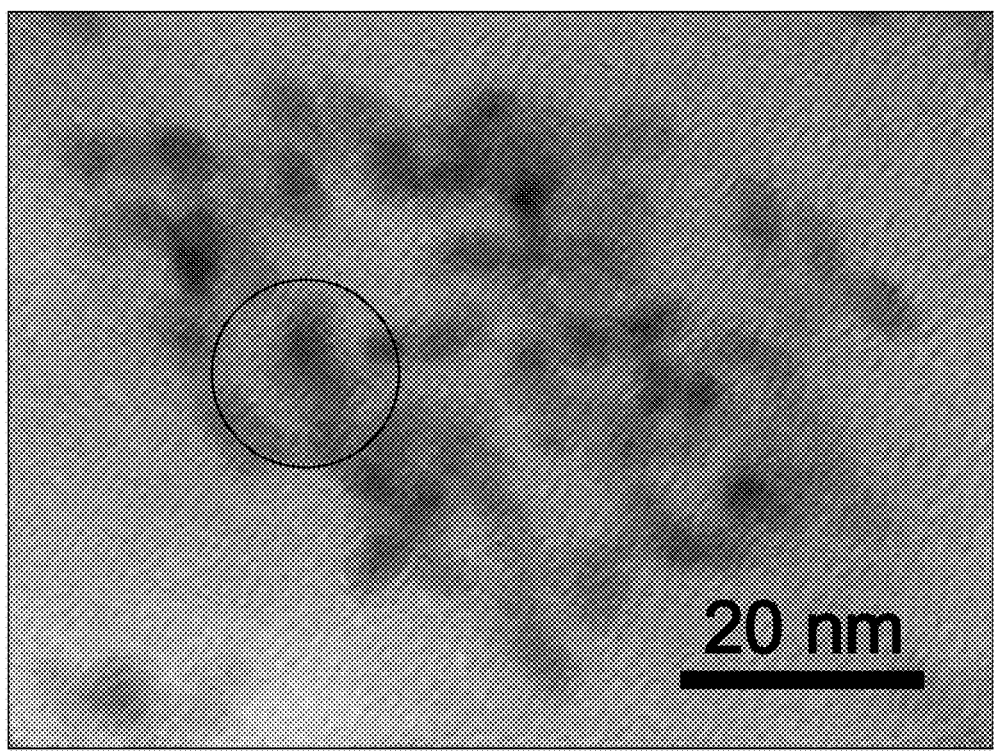
FIG. 9 is a TEM image showing the shape and structure of the quantum dots of Example 7.

FIG. 9 is a TEM image showing the shape and structure of the quantum dots of Example 7.

Example 8

Preparation of Cd and Zn Precursors 7.39 g CdO and 0.27 g zinc acetate anhydrous were added into a three neck round-bottom flask. The mixture was degassed under 100 mTorr for 120 minutes. 10 g trioctylphosphine (TOP), 24.68 g oleic acid and 116.7 g 1-octadecene (ODE) were added into the three neck round-bottom flask to form a Zn—Cd-containing precursor, followed by purging the three neck round-bottom flask with a nitrogen gas.

Preparation of a Mixture of Se and S Precursors 20 ml ODE and 0.74 g sulfur powder were mixed under room temperature to form a sulfur precursor (ODES). 20 ml TOP and 0.79 g selenium powder were mixed under room temperature to form a selenium precursor (TOPSe). The sulfur precursor and the selenium precursor were mixed in a flask to form a Se—S-containing precursor. The flask was purged with a nitrogen gas.

Preparation of CdSe/Cd$_x$Zn$_{1-x}$Se$_y$S$_{1-y}$/ZnS Quantum Dot

The Zn—Cd-containing precursor in the three neck round-bottom flask was heated to 260° C., followed by injecting the Se—S-containing precursor into the three neck round-bottom flask to allow a first stage reaction between the Zn—Cd-containing precursor and the Se—S-containing precursor to occur for one minute and then heating the mixture to 320° C. to allow a second stage reaction to occur for three minutes. After the reaction, the mixture was cooled to 160° C., and was remained at this temperature for one hour. The mixture was then further cooled, and was repeatedly washed with a mixture of 50 ml toluene and 50 ml ethanol so as to obtain a powder of the quantum dot of Example 8.

Figure 10:
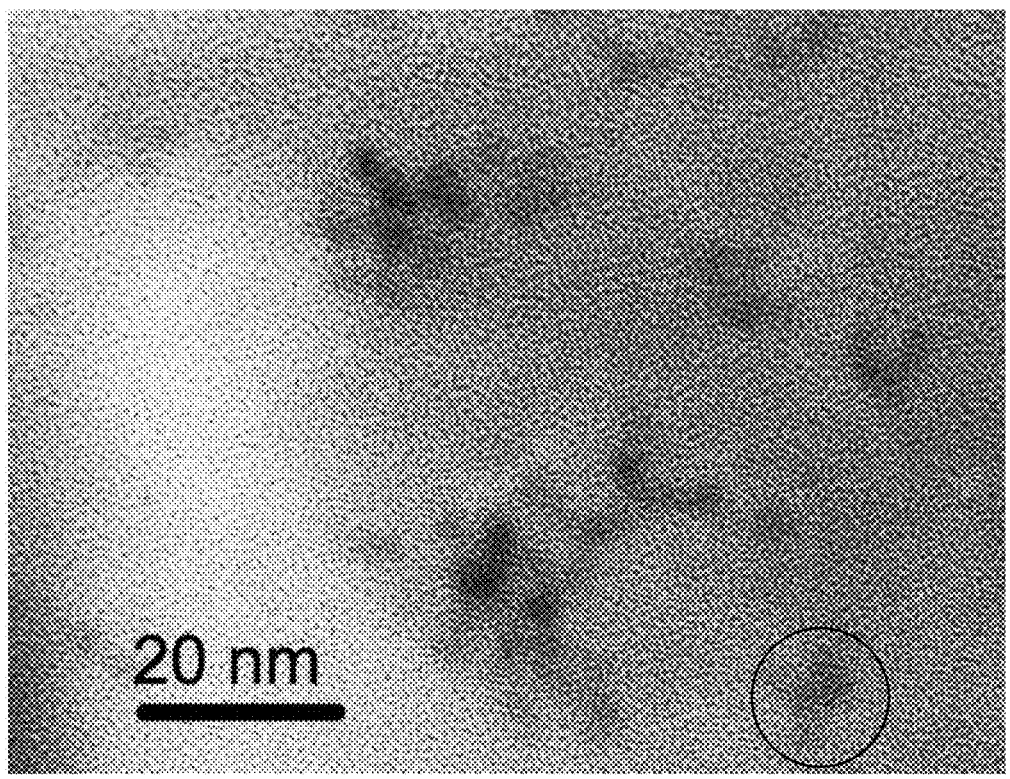
FIG. 10 is a TEM image showing the shape and structure of the quantum dots of Example 8.

FIG. 10 is a TEM image showing the shape and structure of the quantum dots of Example 8.

Example 9

Preparation of Si$_u$Ti$_v$O$_{4-z}$/Pentanedione Hybrid Polymer (STO-OG)

3.1 mmol titanium isopropoxide (TTIP), 33.1 mmol 1-propanol and 3 mmol acetylacetone (ACAC) were mixed together to form a titania precursor. 8.6 mmol tetraethoxysilane (TEOS) and 103.2 mmol ethanol were mixed together to forma silica precursor. The titania precursor and the silica precursor were mixed together, followed by mixing the mixture with deionized water to allow simultaneous hydrolysis and condensation to occur. The mixture was continuously stirred and was subjected to polymerization under room temperature for 48 hours.

Preparation of STO-OG/ZnSe/Zn$_x$Cd$_{1-x}$Se$_y$S$_{1-y}$/ZnS Quantum Dot 1 ml STO-OG thus obtained, 10 mg of the powder of the quantum dot of Example 1 and 1 ml toluene were mixed with stirring for 6 hours, followed by filtration using a centrifugal filter to obtain a precipitate. The precipitate was dissolved in a toluene solution with stirring for about 24 hours to 72 hours to obtain a STO-OG layer wrapped quantum dot. The STO-OG layer thus formed had a layer thickness of about 2 nm to 3 nm. The STO-OG layer was modified by mixing with 1 mg chlorotrimethylsilane (TMCS) with stirring for 12 hours. The modification of the STO-OG layer is to change the polarity of the STO-OG layer, so that the modified STO-OG layer can be dissolved in a non-polar solvent.

Example 10

Preparation of GaN Chip Having Quantum Dots of Example 1

The quantum dots of Example 1 were mixed with poly(dimethylsiloxane) (PDMS) to form a mixture. The mixture was applied to a GaN chip to form a wavelength conversion layer on the GaN chip.

Example 11

Preparation of GaN Chip Having Quantum Dots of Example 2

The quantum dots of Example 2 were mixed with the STO-OG of Example 9 to form a mixture. The mixture was applied to a GaN chip to form a wavelength conversion layer on the GaN chip.

Comparative Example

Preparation of GaN Chip Having Quantum Dots of the Prior Art

The quantum dots of the prior art having a structure of CdSe(core)/ZnS(shell) were applied to a GaN chip to form a wavelength conversion layer on the GaN chip.

Figure 11:
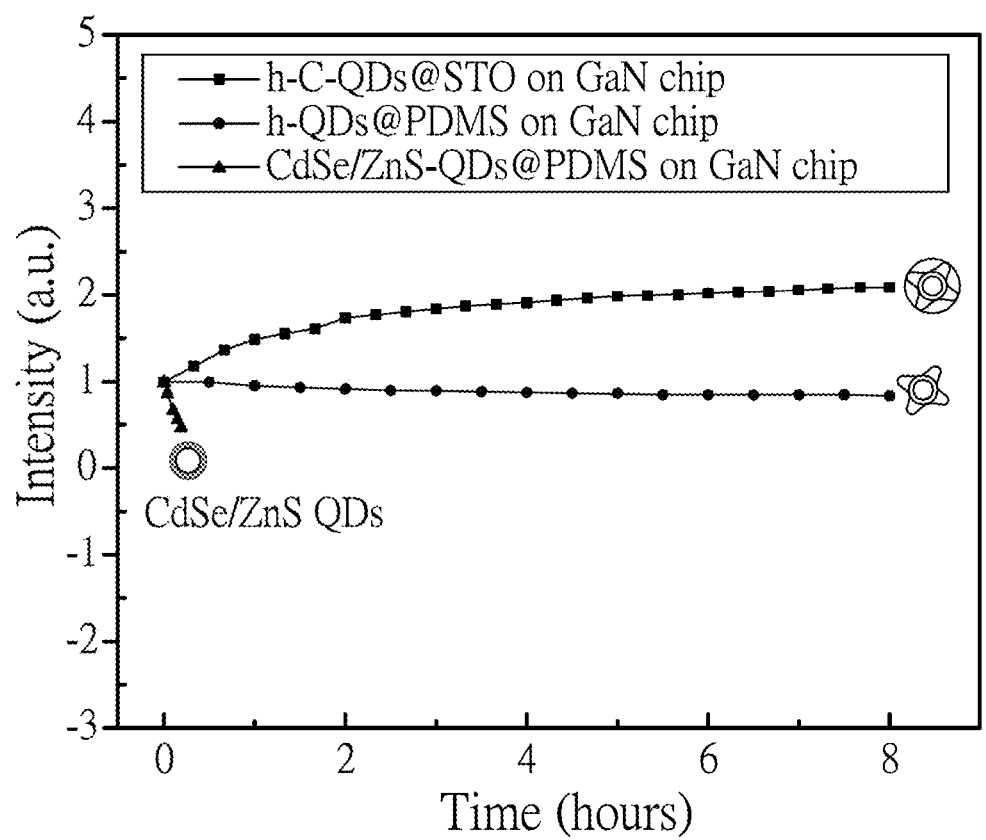
FIG. 11 is a plot of luminous intensity vs time illustrating light emission testing results for coated GaN chips of Examples 10 and 11 and Comparative Example.

FIG. 11 is a plot of luminous intensity vs time illustrating light emission testing results for the coated GaN chips of Examples 10 and 11 and Comparative Example. The results show that the coated GaN chip of the prior art has a 15% decay in the luminous intensity after about 30 minutes, while the coated GaN chip of Example 10 has a 15% decay in the luminous intensity after 8 hours and the coated GaN chip of Example 11 shows no sign of decay in the luminous intensity after 8 hours.

With the inclusion of the multi-pod-structured outer shell 4 in the quantum dot nanocrystal structure of the disclosure, at least one of the aforesaid drawbacks associated with the prior art may be alleviated.

While the disclosure has been described in connection with what is considered the exemplary embodiment, it is understood that the disclosure is not limited to the disclosed embodiment but is intended to cover various arrangements included within the spirit and scope of the broadest interpretation and equivalent arrangements.

What is claimed is:

1. A quantum dot nanocrystal structure comprising:
   a core of a compound M1A1, wherein M1 is a metal selected from the group consisting of Zn, Sn, Pb, Cd, In, Ga, Ge, Mn, Co, Fe, Al, Mg, Ca, Sr, Ba, Ni, Ag, Ti and Cu, and A1 is an element selected from the group consisting of Se, S, Te, P, As, N, I, and O;
   an inner shell enclosing said core and having a composition containing a compound M1$_x$M2$_{1-x}$A1$_y$A2$_{1-y}$, wherein M2 is different from M1 and is a metal selected from the group consisting of Zn, Sn, Pb, Cd, In, Ga, Ge, Mn, Co, Fe, Al, Mg, Ca, Sr, Ba, Ni, Ag, Ti and Cu, A2 is different from A1 and is an element selected from the group consisting of Se, S, Te, P, As, N, I and O, 0<x≤1, 0<y<1, and y decreases over a layer thickness of said inner shell in a direction from said core toward said inner shell; and
   a multi-protrusion-structured outer shell of a compound M1A2 or M2A2, said multi-protrusion-structured outer shell enclosing said inner shell and having a base portion and a plurality of protrusion portions that are spaced apart from one another and that extend from said base portion in a direction away from said inner shell,
   wherein said core, said inner shell and said multi-protrusion-structured outer shell are formed as a monolithic structure.

2. The quantum dot nanocrystal structure of claim 1, wherein x varies over the layer thickness of said inner shell when x is less than 1.

3. The quantum dot nanocrystal structure of claim 1, wherein A1 is Se and A2 is S.

4. The quantum dot nanocrystal structure of claim 3, wherein M1 is Zn, M2 is Cd, and x is less than 1.

5. The quantum dot nanocrystal structure of claim 1, wherein M1 is Cd, M2 is Zn, and x is less than 1.

6. The quantum dot nanocrystal structure of claim 1, wherein said compound $M1_xM2_{1-x}A1_yA2_{1-y}$ is doped with an element A3 that is different from A1 and A2 and that is selected from the group consisting of Se, S, Te, P, As, N, I and O.

7. The quantum dot nanocrystal structure of claim 6, wherein A3 is I.

8. The quantum dot nanocrystal structure of claim 1, further comprising a cover layer of an organic-inorganic oxide hybrid polymer that covers said multi-protrusion-structure outer shell.

9. The quantum dot nanocrystal structure of claim 8, wherein said inorganic-organic oxide polymer has a formula of $Si_uTi_vO_{4-z}/OG$, wherein $0.2 \leq u \leq 0.4$, $0.6 \leq v \leq 0.8$, $0.01 < z < 3.99$, and OG represents organic molecules.

10. The quantum dot nanocrystal structure of claim 1, wherein said core has a diameter ranging from 1 nm to 8 nm.

11. The quantum dot nanocrystal structure of claim 10, wherein the layer thickness of said inner shell ranges from 0.5 nm to 5 nm.

12. The quantum dot nanocrystal structure of claim 10, wherein said protrusion portions have a length ranging from 1 nm to 10 nm.

* * * * *